United States Patent [19]
Bruhnke et al.

[11] Patent Number: 5,725,794
[45] Date of Patent: Mar. 10, 1998

[54] ANTIFREEZE COMPOSITION CONTAINING POLY (OXYALKYLENE) -SUBSTITUTED COLORANT

[75] Inventors: John D. Bruhnke; Steven E. Brown, both of Spartanburg, S.C.

[73] Assignee: Milliken Research Corporation, Spartanburg, S.C.

[21] Appl. No.: 816,294

[22] Filed: Mar. 13, 1997

[51] Int. Cl.$^6$ .................................................. C09K 5/00
[52] U.S. Cl. ........................... 252/73; 252/75; 252/77; 252/78.1; 252/78.3; 8/647
[58] Field of Search ........................ 252/73, 75, 77, 252/78.1, 78.3; 8/647, 661, 662, 657, 675, 676; 540/122; 534/729

[56] References Cited

U.S. PATENT DOCUMENTS

| | | | |
|---|---|---|---|
| 3,157,633 | 11/1964 | Kuhn | 260/200 |
| 3,960,740 | 6/1976 | Truett | 252/73 |
| 4,167,510 | 9/1979 | Brendle | 260/174 |
| 4,284,729 | 8/1981 | Cross et al. | 521/158 |
| 4,468,255 | 8/1984 | Schwartz et al. | 106/288 |
| 4,634,555 | 1/1987 | Baxter et al. | 540/126 |
| 4,703,113 | 10/1987 | Baxter et al. | 534/796 |
| 4,726,844 | 2/1988 | Greenwood | 106/22 |
| 4,732,570 | 3/1988 | Baumgartner et al. | 8/506 |
| 4,738,721 | 4/1988 | Baxter et al. | 106/22 |
| 4,777,248 | 10/1988 | Greenwood | 534/803 |
| 4,871,371 | 10/1989 | Harris | 534/729 |
| 5,039,439 | 8/1991 | Hansman, Jr. et al. | 252/70 |
| 5,176,745 | 1/1993 | Moore et al. | 106/22 |
| 5,240,464 | 8/1993 | Kluger et al. | 8/506 |
| 5,250,708 | 10/1993 | Barry, Jr. | 549/226 |
| 5,270,363 | 12/1993 | Kluger et al. | 524/90 |
| 5,271,868 | 12/1993 | Azechi et al. | 252/358 |
| 5,300,667 | 4/1994 | Kasprzak et al. | 556/437 |
| 5,376,301 | 12/1994 | Fleuren et al. | 252/174.15 |

FOREIGN PATENT DOCUMENTS

| | | |
|---|---|---|
| 0 176 195 | 4/1986 | European Pat. Off. . |
| 0 187 520 | 7/1986 | European Pat. Off. . |

OTHER PUBLICATIONS

Sela et al., "Newly designed polysiloxane–graft–poly(oxyethylene) copolymeric surfactants: preparation, surface activity and emulsification properties, " Colloid Polym Sci 272:684–691 (1994).

Ni et al., "Synthesis of a Novel Polysiloxane–based Polymer Electrolyte and its Ionic Conductivity, " Polymers for Advanced Technologies, vol. 4, pp. 80–84 (1993).

*Primary Examiner*—Anthony Green
*Attorney, Agent, or Firm*—Terry T. Moyer; Timothy J. Monahan

[57] ABSTRACT

A color-stable antifreeze composition containing a polyhydric alcohol, a corrosion inhibitor and a poly(oxyalkylene) -substituted colorant having the structure ABXYZ, where A is an organic chromophore;

B is an electrophilic reactive group covalently bonded to A directly or through a linking group;

X is a nucleophilic linking group covalently bonding B and Y;

Y is a poly(oxyalkylene)-containing moiety; and

Z is a terminal group for Y.

18 Claims, No Drawings

ANTIFREEZE COMPOSITION CONTAINING POLY (OXYALKYLENE) -SUBSTITUTED COLORANT

BACKGROUND OF THE INVENTION

This invention is directed to an antifreeze composition containing a polyhydric alcohol, corrosion inhibitor and a poly(oxyalkylene)-substituted colorant. More particularly, this invention relates to an antifreeze composition comprising a colorant made from a reactive dye having an electrophilic reactive group reacted with a poly(oxyalkylene)-containing moiety having a nucleophilic reactive group.

Antifreeze compositions are subjected to temperature extremes and strong oxidizing conditions. Very few colorants have been found, which are stable in such an environment. The commercial market is dominated by Direct Blue 199 (copper phthalocyanine, tetrasulfonic acid), Acid Green 25 (1,4-bis(4'-methyl-3'-phenylsulfonato) amino anthraquinone) and uranine (sodium fluorescein). Acid Green 25 is commonly combined with uranine to give a fluorescent green composition. A shortcoming of Acid Green 25 is that commercial sources generally have high levels of impurities, which can cause deposits and build up in an engine's cooling system. Consequently, it is necessary to remove such impurities before the dye may be employed in antifreeze compositions. It is believed that many of the impurities arise from the synthesis method employed, which is to sulfonate Solvent Green 3 (C.I. No. 61565) followed by conversion to the sodium salt.

Antifreeze compositions have been provided with indicators that change color in response to the relative concentrations of glycol and water. Truett, U.S. Pat. No. 3,960,740, discloses a 1,2-diamino anthraquinone dye useful as such an indicator.

Hansman, Jr. et al., U.S. Pat. No. 5,039,439, disclose a de-icing fluid incorporating a fluorescein salt which changes color when the fluid freezes. The de-icing fluid is useful for determining the presence of ice on the exterior surface of an aircraft.

Although a few individual colorants have been identified which meet the rigorous requirements and demands placed on an antifreeze composition, there remains a strong demand for alternative dyes, especially alternatives to Acid Green 25, which overcome the aforementioned shortcomings.

Organic chromogens containing poly(oxyalkylene) substituents are disclosed in Kuhn, U.S. Pat. No. 3,517,633, Brendle, U.S. Pat. No. 4,167,510, Cross et al., U.S. Pat. No. 4,284,729, Baumgartner et al., U.S. Pat. No. 4,732,570, Moore et al., U.S. Pat. No. 5,176,745, Kluger et al., U.S. Pat. No. 5,240,464, and Barry, U.S. Pat. No. 5,250,708. Poly (oxyalkylene) substituted colorants made by modifying pigment are disclosed in Schwartz et al., U.S. Pat. No. 4,468, 255.

Several patents and published applications assigned to ICI relate to poly(alkylene oxide)-substituted reactive dyes, for example, Baxter et al, U.S. Pat. No. 4,634,555; Baxter et al, U.S. Pat. No. 4,703,113; Greenwood et al, U.S. Pat. No. 4,726,844; Baxter et al, U.S. Pat. No. 4,738,721; Greenwood, U.S. Pat. No. 4,777,248; EP-A 0176195 to Baxter et al.; EP-A 0187520 to Greenwood (ICI).

The relatively low molecular weights of the poly (oxyalkylenes) required by the ICI art result in dyes which exhibit a high stain factor for many substrates. Moreover, the resulting dyes are solids which must be dissolved in a suitable solvent for most uses.

Polydimethylsiloxanes prepared as copolymers with alkylene oxides are widely used as surfactants. Altering the amounts of alkylene oxide (hydrophile) and dimethylsiloxane (lipophile) affects surfactant properties. The higher the alkylene oxide content the higher the hydrophilicity. Materials with ethylene oxide contents 75% and higher are freely soluble in water and low molecular weight copolymers can be used as wetting agents, anti-foggers, anti-foamants, and slip agents in inks.

An object of the present invention is to provide an antifreeze composition with a colorant which is stable over a wide range of operating conditions. Another object of the invention is to provide a blue dye which can be blended with a yellow fluorescent dye to produce a green fluorescent antifreeze composition; especially a blue dye which exhibits a stability similar to that of the fluorescent dye in order to maintain color, if not intensity. Still another object of the invention is to provide a dye which is relatively free of impurities. The antifreeze composition of the present invention overcomes disadvantages associated with the prior art, e.g., color stability, and has further benefits and advantages discussed herein and as will be apparent to those skilled in the art.

SUMMARY OF THE INVENTION

The present invention relates to an antifreeze composition comprising a polyhydric alcohol, a corrosion inhibitor and a colorant, wherein the colorant is the reaction product of a reactive dye and a poly(oxyalkylene)-containing polymer having a nucleophilic reactive group. The poly(oxyalkylene) -containing polymer is preferably comprised of 3 to 100 alkylene oxide residues selected from the group consisting of ethylene oxide and propylene oxide.

The present invention also relates to an antifreeze composition which comprises a polyhydric alcohol, a corrosion inhibitor and a poly(oxyalkylene)-substituted colorant. Such a colorant can be liquid in the neat form at 25°C., and has the structure ABXYZ, where A is an organic chromophore;

B is an electrophilic reactive group covalently bonded to A directly or through a linking group;

X is a nucleophilic linking group covalently bonding B and Y, selected from the group consisting of NR, O, S, and 4-oxyanilino (—HN—Ph—O—); where R is selected from the group consisting of H, alkyl, aryl, and YZ;

Y is a poly(oxyalkylene)-containing moiety; and

Z is a terminal group for Y.

DETAILED DESCRIPTION OF THE INVENTION

Without limiting the scope of the invention, the preferred embodiments and features are hereinafter set forth. Unless otherwise indicated, all parts and percentages are by weight and conditions are ambient, i.e. one atmosphere of pressure and 25° C. Unless otherwise specified, aliphatic hydrocarbons are from 1–12 carbon atoms in length.

All of the U.S. patents disclosed in this specification are incorporated herein by reference in their entirety.

ANTIFREEZE COMPOSITION

The antifreeze composition of the present invention suitable for use as coolants in an internal combustion engine includes a polyhydric alcohol, corrosion inhibitor and a poly(oxyalkylene)-substituted colorant. Antifreeze composition is typically sold as a concentrate, which is then diluted with water when the composition is introduced into a cooling system, to achieve a polyhydric alcohol to water ratio of from about 1:3 to 3:1. Dilution is not always necessary, however, and the antifreeze composition may be employed neat.

The main component of the antifreeze composition is a water-soluble polyhydric alcohol, which is generally an alkylene glycol, alkylene glycol ether or mixtures thereof. By way of example, the polyhydric alcohol may be selected from ethylene glycol, propylene glycol, butylene glycol, glycerol, diethylene glycol and mixtures thereof. Preferably, the polyhydric alcohol is selected from ethylene glycol and propylene glycol.

An effective amount of a corrosion inhibitor is provided. A wide variety of suitable corrosion inhibitors are known to those skilled in the art and generally include borates, e.g., alkali metal borates, mercaptobenzothiazole, alkali metal phosphates, alkali metal meta borates, silicates, organic acids, amines and polyacrylates. Examples of suitable corrosion inhibitors include the following compounds: sodium tetraborate, alkali metal hydroxides, polyethylene polyamine benzotriazole organic acid adducts, diethylenetriamine benzotriazole organic acid adducts, silicates, cyclohexane acids, hydroxy-substituted aromatic carboxylic acids, aliphatic organic acids and their salts, aromatic organic acids and their salts, tolyltriazoles, hydrocarbyl triazoles, alkyl aromatic organic acids and their salts, polyacrylates and their salts, alkenylaminophosphonate salts, heteropolymolybdates, dicyclopentadiene dicarboxylates, hydrocarbyl sulfonates, sulfophenethylsiloxanes, (silylalkyl)phosphonic acid—silicate polymers, sodium sebacate, methyleneazelaic acid, naphthalene dicarboxylic acid salts, siloxanes, imidazoline and ethanolamine.

On a neat basis, the antifreeze composition typically includes from 70–99%, preferably, 80–99% of a polyhydric alcohol;

0.1 to 30%, preferably, 0.1 to 20% of a corrosion inhibitor; and 0.005 to 5%, preferably, 0.005 to 0.5% of a colorant, e.g., 0.01 to 0.05%.

The antifreeze composition of the present invention may further comprise auxiliary components such as defoamers, surfactants, scale inhibitors, e.g., polycarboxylates, in mounts up to 10 wt % of the composition. The relative concentration of the components is not deemed to be critical and may be varied without deviating from the scope of the invention.

Poly(oxyalkylene)-Substituted Colorant

The colorant employed in the present invention comprises a poly(oxyalkylene) substituent. The colorant may be synthesized by the reaction of a reactive dye with the polymer through a linking group. Reactive dyes can be represented as AB and are those dyes comprising an organic chromophore component A which is covalently bonded directly or through a linking group, such as an amino-containing group, to an electrophilic functional group B capable of reacting with a nucleophile to form a covalent bond either by addition or displacement.

Organic Chromophore A

A broad range of reactive dyes has been synthesized and includes those incorporating: azo groups such as monoazo, bisazo, and polyazo including their complexes with Cr, Fe, Co, and Cu; phthalocyanine; anthraquinone; aza [18] annulene; formazan copper complex; triphenodioxazine; nitroso; nitro; diarylmethane; triarylmethane; xanthene; acridene; methine; thiazole; indamine; azine; oxazine; thiazine; quinoline; indigoid; indophenol; lactone; aminoketone; hydroxyketone; and stilbene chromophores. Preferably, the reactive dye incorporates an azo, phthalocyanine or anthraquinone chromophore group.

Electrophilic Functional Group B

The reactive dye moieties AB contain organic chromophore A and at least one electrophilic functional group B. When multiple functional groups are provided, it is often desirable that the groups vary in reactivity, to maximize conversion. Examples of electrophilic functional groups which may be incorporated into the reactive dye include: monohalotriazine; dihalotriazine; monohalopyrimidine; dihalopyrimidine; trihalopyrimidine; dihaloquinoxaline; dihalopyridazone; dihalophthalazine; halobenzothiazole; mono-(m-carboxypyridinium)-triazine; amino epoxide; methylamino; sulfatoethyl sulfone; sulfatoethyl sulfonamide; chloroethyl sulfone; vinyl sulfone; phenylamino sulfone; acrylamide; alpha-haloacryloylamide; alpha, beta-dihalopropionyl amide; halosulfonyl pyrimidine; sulfatoethylamino sulfone; sulfatopropionamide; halosulfothiazinylamide and haloacetylamide. The halo component may be selected from fluorine, chlorine and bromine. Preferably, the reactive dye incorporates an electrophilic functional group selected from monochlorotriazine, monofluorotriazine, dichlorotriazine, sulfatoethyl sulfone, vinyl sulfone, 2,3-dichloroquinoxaline, and 2,4-difluor-5-chloropyrimidine groups.

Reactive dyes meeting the above description are commercially available, described in the Colour Index, 3rd Edition, the Society of Dyers and Colourists (1971) and in the available published literature. By way of example and not limitation, the following reactive dyes may be employed: C.I. Reactive Black 5, C.I. Reactive Blue 2, C.I. Reactive Blue 4, C. I. Reactive Blue 5, C.I. Reactive Blue 7, C.I. Reactive Blue 15, C.I. Reactive Blue 19, C. I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange 16, C.I. Reactive Orange 78, C.I. Reactive Yellow 3, C.I. Reactive Yellow 13, C.I. Reactive Yellow 14, C.I. Reactive Yellow 17, and C.I. Reactive Yellow 95.

Nucleophilic Linking Group X

The poly(oxyalkylene)-containing substituent Y is covalently bonded to the electrophilic group B of reactive dye AB through X, a nucleophilic linking group. By way of example, X may be selected from the group consisting of NR, O, S, and 4-oxyanilino (—HN—Ph—O—); where R is selected from the group consisting of H, alkyl, and YZ. Two poly(oxyalkyene)-containing substituents may be bonded to reactive dye AB through a linking group comprising a trivalent atom, e.g., N. The number of poly(oxyalkylene) chains per chromophore may be from 1–6, preferably 1–4, most preferably 1, 2 or 3.

Poly(oxyalkylene)-Containing Substituent Y

Y can be a poly(oxyalkylene)-containing moiety comprising the formula $(C_aH_{2a}O)_m(C_bH_{2b}O)_n$ where a and b are different and from 1 to 8, preferably from 1 to 4, e.g., a is 2, b is 3, m is at least 3, preferably at least 11, e.g., where lower staining factor of the resulting colorant composition is desired; n is 0 to 15 inclusive, e.g., 0 or 1. The molecular weight of the Y moiety can be less than 4000 and can range from 130 to 4000, preferably from 480 to 4000.

Typical of such Y substituents are poly(oxyalkylene) polymers and copolymers. Polymeric substituents are preferred. In this regard, polyalkylene oxides and copolymers of same which may be employed to provide the colorant of the present invention are, without limitation, polyethylene oxides, polypropylene oxides, polybutylene oxides, copolymers of polyethylene oxides, polypropylene oxides and polybutylene oxides, and other copolymers including block copolymers, in which a majority of the polymeric substituent is polyethylene oxide, polypropylene oxide and/or polybutylene oxide. While such substituents generally have an average molecular weight in the range of from 130 to 4000, say, 130 to 1400, they should not be so limited.

Polysiloxane-Poly(oxyalkylene) Copolymer

In a particular embodiment of the present invention, Y can be described as a polysiloxane-poly(oxyalkylene) copolymer which incorporates (a) a polysiloxane segment characterized by a —Si($R^1$)($R^2$)O— repeating group wherein $R^1$ and $R^2$ are each selected from the group consisting of alkyl, phenyl, vinyl, 3,3,3-trifluoropropyl, and hydrogen (preferably $R^1$ and $R^2$ are alkyl, with methyl especially preferred); and (b) a polyether segment characterized by a poly (oxyalkylene) group which may be i) in the copolymer backbone or ii) pendent from a siloxane or silane repeating group.

Y copolymers having pendent poly(oxyalkylene) groups along a polysiloxane backbone may be synthesized by incorporating siloxane groups with reactive functionalities into the backbone of the polymer. The siloxane groups may be alkoxylated, esterified or otherwise provided with a poly(oxyalkylene) functionality. Copolymers having a polysiloxane backbone and pendent poly(oxyalkylene) groups are commercially available in the Masil Silicone Surfactants product line, available from PPG Industries, Inc., Gurnee, Ill., U.S.A.

Polysiloxane-polyether copolymers are disclosed in the following patents: Azechi et al. U.S. Pat. No. 5,271,868; Kasprzak et al. U.S. Pat. No. 5,300,667; and Fleuren et al. U.S. Pat. No. 5,376,301. Another method of synthesizing polysiloxane-polyether copolymers is disclosed by Jainlong Ni et al. "Synthesis of a Novel Polysiloxane-based Polymer Electrolyte and its Ionic Conductivity," Polymers for Advanced Technologies Vol. 4, pp 80–84 (1993). Allyl polyethers are grafted onto polysiloxane to form the copolymer. Sela et al., "Newly Designed Polysiloxane—graft— poly(oxyethylene) Copolymeric Surfactants," Colloid PolymSci 272:684–691 (1994) disclose comb grafted surfactants based on a poly(methylhydrogen siloxane)/poly (dimethylsiloxane) block copolymer backbone which is sililated with a vinyl terminated poly(oxyethylene) group.

Alternatively, the polysiloxane-poly(oxyalkylene) copolymer is a block copolymer incorporating a poly (oxyalkylene) substituted silane, e.g., copolymer incorporating silane a group having the structure —Si($R^3$-poly (oxyalkylene))($R^4$)—, where $R^3$ is an alkylene group, preferably methylene or ethylene, and $R^4$ is H, alkyl, or phenyl, preferably methyl. Such copolymers are commercially available, for example, the dimethylsiloxane-alkylene oxide copolymers available from Petrarch Systems, Silanes and Silicones Group, Bristol, Pa, U.S.A.

Block copolymers having a poly(oxyalkylene) segment in the backbone may be synthesized by procedures well known in the art, and are commercially available from Dow Corning, Midland, Mich., U.S.A. under the 5103 Fluid and Q, e.g., Q2-5211, wetting agent product lines.

Y can also be particularly described as a poly (oxyalkylene)-containing polysiloxane moiety formula selected from the group consisting of $(OSi(R')(R''))_iO$ $(SiR'R'''O(C_aH_{2a}O)_m(C_bH_{2b}O)_n)_j$ and $(OSi(R')(R''))_i(R'''O(C_aH_{2a}O)_m(C_bH_{2b}O)_n)_j$ where R' and R" are each alkyl, preferably C1 to C4 alkyl, more preferably methyl, R''' is alkylene, preferably C1 to C3 alkylene, more preferably ethylene, i and j are integers selected to provide a molecular weight for Y of 300 to 10000, preferably 450 to 5000, more preferably 800 to 1400, i is at least 3, j is at least 1, a and b are different and from 1 to 8, preferably from 1 to 4, more preferably from 2 to 3, m is at least 3, preferably 5 to 15, and n is from 0 to 15, preferably 0.

The poly(oxyalkylene)-containing substituent Y has a molecular weight which can range from 300 to 10000, preferably 450 to 5000, more preferably 800 to 1400.

Further description of the polysiloxane poly(oxyalkylene) copolymers useful in the present invention may be found in the Encyclopedia of Polymer Science and Engineering, John Wiley & Sons, Vol. 15, page 234–244 (1989) and the references cited therein.

End Group Z

The end group Z of poly(oxyalkylene)-containing substituent Y is not believed to be critical insofar as the functioning of the colorant is concerned. The end group Z can be any suitable terminal group, e.g., one selected from the group consisting of hydroxyl, alkyl, e.g., $C_1$ to $C_4$ alkyl, amino, amido, alkyl ester, e.g., acetyl, phenyl ester, alkyl ether, alkyl acetal, and BA where Y has a nucleophilic end group (such as where the polysiloxane-poly(oxyalkylene) copolymer is a dime). The end group can itself contribute to solubility characteristics of the colorant product. Examples of other suitable, terminal groups are those disclosed in U.S. Pat. No. 5,270,363 to Kluger, et al, for poly(oxyalkylene) polymers. Where Z is XBA the resulting colorant has the structure ABXYXBA where X,B, and A are as described above.

Colorant Preparation

The colorant compositions used in the present invention can be readily prepared by covalently bonding reactive dye AB (as listed above) to the poly(oxyalkylene)-containing XYZ group by heating an aqueous composition of the copolymer and the dye to a temperature of at least 40° C., preferably at least 60° C. The reaction time will vary according to the temperature employed, i.e., increasing the temperature will increase the rate of reaction. For example, at 85° C., the reaction is complete in two hours. The pH of the reaction composition is maintained to avoid protonating amine if present in the reaction mixture. A molar excess of the poly(oxyalkylene)-containing group XYZ is typically employed to inside complete conversion and to minimize the presence of unreacted and unsubstituted reactive dye, which can cause undesired staining. Acid scavenger such as sodium carbonate is preferably present in the reaction mixture, say, in about equivalent amounts. The poly (oxyalkylene)-substituted colorant of the present invention formed in the reaction composition may be concentrated or diluted as desired for a particular application by evaporation or the addition of water, respectively.

Suitable examples of XYZ reactants from which the present colorant compositions can be prepared include commercially available polyoxyalkyleneamines from the JEFFAMINE® series available from Huntsman Chemical and described in Texaco Chemical Company, New Product Development brochures as the M, D, ED, DU, BuD, T, MNPA, and EDR series. These polyoxyalkylene amines contain primary amino groups attached to the terminus of a polyether backbone which can be based on either propylene oxide (PO), ethylene oxide (EO), or mixed EO/PO. The JEFFAMINE® family consists of monoamines, diamines and triamines, which are available in a variety of molecular weights, ranging from 230 to 6000. JEFFAMINE® compounds are designated by letter and number, the latter representing approximate molecular weight. JEFFAM- INES® include M-Series (monoamines), D-Series (amine-terminated polypropylene glycols), ED-Series (polyether diamines based on a predominately polyethylene oxide backbone imparting water solubility), DU-Series (urea condensate of D-Series products to provide a diamine product of increased molecular weight which is amine terminated), BuD-Series (urea condensate of D-Series products to provide a urea terminated product), and T-Series (propylene oxide based triamines prepared by reacting PO with a triol initiator, followed by amination of the terminal hydroxyl groups). These amines are further described in U.S. Pat. No. 5,270,363 to Kluger et al.

The solubility of the colorant used in the present invention can vary by the relative hydrophilic/oleophilic character of the poly(oxyalkylene) substituent and the end group, as well as the presence or absence of ionic groups on the organic chromophore. Preferably, the present colorant compositions are soluble in polar solvent, e.g., methanol and water. In particular, the present colorant compositions are greater than: 10%, 25%, 50%, or even 90% soluble in cold water.

In one embodiment of the invention, the colorant component of the composition is a blend of a blue dye selected from the compounds of the above formula, and a yellow, uranine dye, to achieve a composition having a shade consistent with commercial green antifreeze products, such as Prestone® antifreeze/coolant, manufactured by Prestone Products Corporation, Danbury, Conn. The concentration of the blue and yellow dye will vary slightly depending on the precise identity of the blue dye component.

The invention may be further understood by reference to the following examples, but is not intended to be unduly limited thereby.

General Reaction Conditions for Preparation of Poly(oxyethylene)-Substituted Colorant:

One equivalent of reactive dyestuff was mixed with about 5–10% molar excess of nucleophilic polymer, one equivalent of sodium carbonate (or other suitable acid scavenger), and enough water to afford mixing. The reaction mixture was then heated to 80°–100° C. for 2–4 hrs. and the resultant solution then phase separated. The concentrated polymeric colorant phase was then brought to a neutral pH and further diluted with water if desired.

EXAMPLE 1

Twenty-five gm of C.I. Reactive Blue 19 (25%) were mixed with 7.2 gm of JEFFAMINE® M-715 obtained from Huntsman (formerly Texaco Chemical Company), Bellaire, Tex., and 1.1 gm of sodium carbonate. The mixture was heated to 85° C. for two hours. The concentrated polymeric colorant was phased from the salt phase and diluted with water.

EXAMPLE 2

62.8 gm of C.I. Reactive Blue 19 (50%) is mixed with 66.2 gm of Fluid Q4-3667 (poly(oxyethylene-dimethylsiloxane)copolymer) available from Dow Corning, Midland, Mi., U.S.A., 3 gm of sodium carbonate, and 100 gm water. The mixture is heated to 85° C. for two hours. The concentrated polymeric colorant is then diluted with water.

EXAMPLE 3

11.9 gm of C.I. Reactive Blue 7 were mixed with 7.2 gm of JEFFAMINE® M-715, 1.1 gm of sodium carbonate, and 25 gm water. The mixture was heated to 85° C. for two hours. The concentrated polymeric colorant was phased from the salt phase and diluted with water.

EXAMPLE 4

61.5 gm of C.I. Reactive Blue 7 (60%) is mixed with 120 gm of Fluid Q4-3667 (poly(oxyethylene-dimethylsiloxane) copolymer) and 5.3 gm of sodium carbonate. The mixture is heated to 85° C. for two hours. The concentrated polymeric colorant is then diluted with water.

EXAMPLE 5

6.2 gm of C.I. Reactive Red 2 were mixed with 14.3 gm of JEFFAMINE® M-715, 2.1 gm of sodium carbonate, and 25 gm water. The mixture was heated to 85° C. for two hours. The concentrated polymeric colorant was phased from the salt phase and diluted with water.

EXAMPLE 6

61.6 gm of C.I. Reactive Red 2 (50%) is mixed with 146.8 gm of Fluid Q4-3667 (poly(oxyethylene-dimethylsiloxane) copolymer), 5.8 gm of sodium carbonate, and 100 gm water. The mixture is heated to 85° C. for two hours. The concentrated polymeric colorant is then diluted with water.

EXAMPLE 7

Six gm of C.I. Reactive Yellow 3 were mixed with 10 gm of JEFFAMINE® M-1000, 1.1 gm of sodium carbonate, and 25 gm water. The mixture was heated to 85° C. for two hours. The concentrated polymeric colorant was phased from the salt phase and diluted with water.

The resulting dyes were incorporated into antifreeze compositions of the following formulations (at a color loading of 0.1 g of a 1 ABS solution in 100 g antifreeze where 1 ABS is 1 Abs/gm·cm/L):

I: ethylene glycol, 85–95%; diethylene glycol, 0–10%; borax, benzoic acid and/or dipotassium phosphate, 2%;

II: ethylene glycol, 90%; diethylene glycol, 5%; inhibitors: ($NaB_4O_7·H_2O$), 2%; water, 3%;

III: ethylene glycol, 40.6%; water, 40.6%; mercaptobenzothiazole, 7.1%; disodium hydrogenphosphate, 8.1%; borax, 3.6%;

IV: ethylene glycol, 95%; monoethanolamine, 0.15%; water, 4.85%.

The colored antifreeze formulations were tested for stability using the Antifreeze Glassware Testing Procedure (ASTM D 1384-87) employing metal coupons (copper, solder, brass, steel, cast iron, cast aluminum) in a corrosive water solution (148 mg sodium sulfate, 165 mg sodium chloride, 138 mg sodium bicarbonate, one liter of water), to which 33% colored antifreeze formulation is added. The coupons were treated for two weeks at 85° C. with an air sparge. The ratio of colorant peak to uranine (fluorescent yellow colorant) peak taken after two weeks was compared with the ratio measured at the beginning of the test for % color retained. The results (% color retained) were obtained by scanning samples from 350–700 nm on a spectrophotometer for initial absorbance and post-sparging absorbance. The corrosive water solution was used as baseline. Results are set out below in Table I and show that the present invention provides antifreeze formulations having suitable color stability under simulated antifreeze operating conditions.

TABLE I

| Glassware Tests (% Color Retained) | Antifreeze Solution I | Antifreeze Solution II | Antifreeze Solution III | Antifreeze Solution IV |
|---|---|---|---|---|
| Example 1 Reactive Blue 19 + Jeffamine | 80 | 80 | 28 | 104 |
| Example 2 Reactive Blue 19 + Siloxy | — | 68 | 75 | 94 |
| Example 3 Reactive Blue 7 – Jeffamine | 50 | 57 | 105 91 | 106 96 |
| Example 4 Reactive Blue 7 + Siloxy | 104 | 97 | — | — |
| Example 5 Reactive Red 2 + Jeffamine | 17 | 65 | — | — |
| Example 6 Reactive Red 2 + Siloxy | 8 | 16 | — | — |
| Example 7 Reactive Yellow 3 + Jeffamine | 33 | 89 | — | — |

There are of course, many alternate embodiments and modifications of the invention which are intended to be included within the scope of the following claims.

It is claimed:

1. An antifreeze composition comprising a polyhydric alcohol, a corrosion inhibitor and a poly(oxyalkylene) substituted colorant having the structure ABXYZ, where A is an organic chromophore;

B is an electrophilic reactive group covalently bonded to A directly or through a linking group;

X is a nucleophilic linking group covalently bonding B and Y, selected from the group consisting of NR, O, S, and 4-oxyanilino (—HN—Ph—O—); where R is selected from the group consisting of H, alkyl, aryl, and YZ;

Y is a poly(oxyalkylene)-containing moiety; and

Z is a terminal group for Y.

2. The composition of claim 1 wherein

A is an organic chromophore selected from the group consisting of azo, phthalocyanine, anthraquinone, aza annulene, formazan copper complex, nitroso, nitro, diarylmethane, triarylmethane, xanthene, acridene, methine, thiazole, indamine, azine, oxazine, thiazine, quinoline, indigoid, indophenol, lactone, aminoketone, hydroxyketone, and stilbene chromophores; and B is an electrophilic reactive group selected from the group consisting of monohalopyrimidine, dihalopyrimidine, trihalopyrimidine, dihaloquinoxaline, dihalopyridazone, dihalophthalazine, halobenzothiazole, amino epoxide, methylamino, sulfatoethyl sulfone, sulfatoethyl sulfonamide, chloroethyl sulfone, vinyl sulfone, phenylamino sulfone, alpha-haloacryloylamide, alpha, beta-dihalopropionyl amide, halosulfonyl pyrimidine, sulfatoethylamino sulfone, sulfatopropionamide, halosulfothiazinylamide, and haloacetylamide, covalently bonded to A directly or through a linking group;

Y comprises an element selected from the group consisting of i) $(C_aH_{2a}O)_m(C_bH_{2b}O)_n$ where a and b are different and from 1 to 8, m is at least 3, n is 0 to 15; and ii) poly(oxyalkylene)-containing polysiloxane; and Z is a terminal group of Y, selected from the group consisting of hydroxyl, alkyl, amino, amido, alkyl ester, phenyl ester, alkyl ether, alkyl acetal, and BA where Y has a nucleophilic end group.

3. The composition of claim 2 wherein said poly(oxyalkylene)-containing polysiloxane is a polysiloxane-poly(oxyalkylene) copolymer having a backbone and a molecular weight of 300 to 10000 which comprises:

(a) a polysiloxane segment characterized by a —Si($R^1$)($R^2$)O— repeating group wherein $R^1$ and $R^2$ are each selected from the group consisting of alkyl, phenyl, vinyl, 3,3,3-trifluoropropyl, and hydrogen; and (b) a polyether segment characterized by a poly(oxyalkylene) group which is i) in the copolymer backbone or ii) pendent from a siloxane or silane repeating group, said poly(oxyalkylene) group comprising 5 to 95 wt % of Y.

4. The composition of claim 3 wherein Y comprises a poly(oxyalkylene)-containing polysiloxane moiety formula selected from the group consisting of $(OSi(R')(R''))_iO$ $(SiR'R'''O(C_aH_{2a}O)_m(C_bH_{2b}O)_n)_j$ and $(OSi(R')(R''))_i(R'''O(C_aH_{2a}O)_m(C_bH_{2b}O)_n)_j$ where R' and R'' are each alkyl, R''' is alkylene, i and j are integers selected to provide a molecular weight for Y of 300 to 10000, i is at least 3, j is at least 1, a and b are different and from 1 to 8, m is at least 3, and n is from 0 to 15.

5. The composition of claim 3 wherein

A is selected from the group consisting of azo, phthalocyanine and anthraquinone chromophores;

B is selected from the group consisting of monochlorotriazine, dichlorotriazine, monofluorotriazine, sulfatoethyl sulfone, vinyl sulfone, 2,3-dichloroquinoxaline and 2,4-difluor-5-chloropyrimidine;

X is NR where R is selected from the group consisting of H, alkyl, aryl, and YZ; and Z is a terminal group for Y, selected from the group consisting of OH, $C_1$ to $C_4$ alkyl, acetyl, amino, and amido.

6. The composition of claim 5 wherein

A is anthraquinone;

Y is a poly(oxyalkylene)-containing moiety comprising the formula $(C_aH_{2a}O)_m(C_bH_{2b}O)_n$ where a is 2, b is 3; and Z is selected from the group consisting of OH and amino.

7. The composition of claim 4 wherein R' and R'' are each methyl, a is 2, b is 3, and n is at least 1.

8. The composition of claim 4 wherein R' and R'' are each methyl, a is 2, and n is 0.

9. The composition of claim 4 wherein R' and R'' are each methyl, a is 3, and n is 0.

10. The composition of claim 2 wherein AB is a reactive dye moiety.

11. The composition of claim 2 wherein AB is selected from the group consisting of C.I. Reactive Black 5, C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 24, C.I. Reactive Orange 4, C.I. Reactive Orange 13, C.I. Reactive Orange, 16, C.I. Reactive Orange 78, C.I. Reactive Yellow 3, C.I. Reactive Yellow 13, C.I. Reactive Yellow 14, C. I. Reactive Yellow 17, and C.I. Reactive Yellow 95; and Y has a molecular weight ranging from 300 to 10,000.

12. The composition of claim 2 wherein AB is selected from the group consisting of C.I. Reactive Blue 2, C.I. Reactive Blue 4, C.I. Reactive Blue 5, C.I. Reactive Blue 7, C.I. Reactive Blue 15, C.I. Reactive Blue 19, C.I. Reactive Blue 27, and wherein Y has a molecular weight ranging from 450 to 5,000.

13. The composition of claim 12 wherein AB is selected from the group consisting of C.I. Reactive Blue 7, C.I. Reactive Blue 19, Reactive Red 2, and Reactive Yellow 3.

14. The composition of claim 2 wherein said colorant is liquid in the neat form at 25° C.

15. The composition of claim 2 wherein said polyhydric alcohol is selected from the group consisting of ethylene glycol and propylene glycol.

16. The composition of claim 2 wherein said polyhydric alcohol is ethylene glycol.

17. An antifreeze composition comprising on a neat basis

80–99 wt. % of a polyhydric alcohol;

0.1 to 20 wt. % of a corrosion inhibitor; and 0.005 to 0.5 wt. % of a poly(oxyalkylene)-substituted colorant having the structure ABXYZ, where A is an organic chromophore;

B is an electrophilic reactive group covalently bonded to A directly or through a linking group;

X is a nucleophilic linking group covalently bonding B and Y, selected from the group consisting of NR, O, S, and 4-oxyanilino (—HN—Ph—O—); where R is selected from the group consisting of H, alkyl, aryl, and YZ;

Y is a poly(oxyalkylene)-containing moiety; and

Z is a terminal group for Y, selected from the group consisting of hydroxyl, alkyl, amino, amido, alkyl ester, phenyl ester, alkyl ether, alkyl acetal, and BA where Y has a nucleophilic end group.

18. The composition of claim 17 wherein the antifreeze composition comprises on a neat basis 80–99% of said polyhydric alcohol;

0.1 to 20% of said corrosion inhibitor; and 0.005 to 0.5% of said colorant.

* * * * *